US006920451B2

(12) United States Patent
Shaw

(10) Patent No.: US 6,920,451 B2
(45) Date of Patent: Jul. 19, 2005

(54) METHOD FOR THE MANIPULATION, STORAGE, MODELING, VISUALIZATION AND QUANTIFICATION OF DATASETS

(75) Inventor: Sandy C. Shaw, San Francisco, CA (US)

(73) Assignee: Health Discovery Corporation, Savannah, GA (US)

(*) Notice: Subject to any disclaimer, the term of this patent is extended or adjusted under 35 U.S.C. 154(b) by 141 days.

(21) Appl. No.: 09/766,247

(22) Filed: Jan. 19, 2001

(65) Prior Publication Data

US 2001/0047376 A1 Nov. 29, 2001

Related U.S. Application Data

(60) Provisional application No. 60/177,544, filed on Jan. 21, 2000.

(51) Int. Cl.$^7$ ............................................. G06F 17/30
(52) U.S. Cl. ........................ 707/6; 707/102; 707/104.1
(58) Field of Search ......................... 707/6, 104.1, 102

(56) References Cited

U.S. PATENT DOCUMENTS

| | | | | |
|---|---|---|---|---|
| 4,210,961 A | * | 7/1980 | Whitlow et al. | ................ 707/7 |
| 5,416,848 A | * | 5/1995 | Young | ........................ 382/191 |
| 5,577,249 A | * | 11/1996 | Califano | ...................... 707/100 |
| 5,706,498 A | * | 1/1998 | Fujimiya et al. | ................ 707/6 |
| 5,717,788 A | * | 2/1998 | Barnsley | ...................... 382/249 |
| 5,802,525 A | * | 9/1998 | Rigoutsos | ................ 707/103 R |
| 5,838,832 A | * | 11/1998 | Barnsley | ...................... 382/249 |
| 5,857,036 A | * | 1/1999 | Barnsley et al. | ............ 382/248 |

(Continued)

FOREIGN PATENT DOCUMENTS

WO   WO9908225   2/1999

OTHER PUBLICATIONS

"An Algorithmic Approach to Multiple Complete Digest Mapping"—Daniel P. Fasulo, Tao Jiang, Richard M. Karp, Reuben Settergren and Edward C. Thayer—Computational molecular biology—Jan. –1997; ACM–1997 (pps:118–127).*

(Continued)

*Primary Examiner*—Jean M. Corrielus
*Assistant Examiner*—Anh Ly
(74) *Attorney, Agent, or Firm*—Tin-Cheun Yeung; Everest Intellectual Property Law Group

(57) ABSTRACT

There is described a method for manipulation, storage, modeling, visualization, and quantification of datasets, which correspond to target strings. A number of target strings are provided. An iterative algorithm is used to generate comparison strings corresponding to some set of points that can serve as the domain of an iterative function. Preferably these points are located in the complex plane, such as in and/or near the Mandelbrot Set or a Julia Set. These comparison strings are also datasets. The comparison string is scored by evaluating a function having the comparison string and one of the plurality of target strings as inputs. The score measures a relationship between a comparison string and a target string. The evaluation may be repeated for a number of the other target strings. The score or some other property corresponding to the comparison string is used to determine the target string's placement on a map. The target string may also be marked by a point on a visual display. The coordinates of the point corresponding to the target string or properties of the comparison string may be stored in memory, a database or a table. Mapped or marked points in a region of interest can be explored by examining a subregion with higher resolution. The points are analyzed and/or compared by examining, either visually or mathematically, their relative locations, their absolute locations within the region, and/or metrics other than location.

71 Claims, 3 Drawing Sheets

U.S. PATENT DOCUMENTS

| | | | | |
|---|---|---|---|---|
| 5,884,016 | A | * | 3/1999 | Allen et al. .................. 345/419 |
| 5,893,095 | A | * | 4/1999 | Jain et al. ....................... 707/6 |
| 6,092,065 | A | * | 7/2000 | Floratos et al. ................. 707/6 |
| 6,108,666 | A | * | 8/2000 | Floratos et al. ........... 707/104.1 |
| 6,141,657 | A | * | 10/2000 | Rothberg et al. ............... 707/6 |
| 6,223,186 | B1 | * | 4/2001 | Rigault et al. ............ 707/104.1 |
| 6,243,713 | B1 | * | 6/2001 | Nelson et al. ............ 707/104.1 |
| 6,366,280 | B1 | * | 4/2002 | Allen et al. .................. 345/419 |
| 6,389,428 | B1 | * | 5/2002 | Rigault et al. ............ 707/104.1 |
| 6,453,246 | B1 | * | 9/2002 | Agrafiotis et al. ........... 382/225 |
| 6,507,843 | B1 | * | 1/2003 | Dong et al. ...................... 707/6 |
| 6,603,472 | B2 | * | 8/2003 | Allen et al. .................. 345/419 |

OTHER PUBLICATIONS

Tino, P., "Spatial Representation of Symbolic Sequences Through Iterative Function Systems," *IEEE Transactions on Systems, Man and Cybernetics—Part A: Systems and Humans*, vol. 29, No. 4, Jul. 1999, pp. 386–393, XP002166332.

Tominaga Y., et al., "Data structure comparison using fractal analysis," *Chemometrics and Intelligent Laboratory Systems, NL*, Elsevier Science Publishers, B.V. Amsterdam, vol. 39, No. 2, Dec. 1, 1997, pp. 187–193, XP004108621.

Shaw et al., "A Novel Method For Visualizing Similarity In Gene Expression And Other Large Datasets," Proceedings of the ISCA 16th International Conference, Mar. 28–30, 2001.

* cited by examiner

METHOD FOR THE MANIPULATION, STORAGE, MODELING, VISUALIZATION AND QUANTIFICATION OF DATASETS

RELATED APPLICATIONS

This application claims priority to Provisional Application Ser. No. 60/177,544 filed Jan. 21, 2000.

FIELD OF THE INVENTION

This present invention relates to methods of manipulation, storage, modeling, visualization and quantification of datasets.

BACKGROUND OF THE INVENTION

The standard techniques currently being used to analyze large datasets are Cluster Analysis techniques and Self-Organizing Maps. These techniques, however, have many disadvantages. They do not allow for the fingerprinting and visualization of an entire dataset, and missing values are not easily accommodated. The computational requirements are high for these techniques, and the mapping time increases exponentially with the size of the dataset. The current data needs to be reanalyzed when new datasets are added to the analysis, and vastly different results can occur for each new dataset or group of datasets added. Analyzing large numbers of massive datasets is difficult.

To take optimum advantage of the information in multiple, large sets of data, we need new, innovative tools. There is a need for methods that enable easy identification and visualization of potentially significant similarities and differences between multiple large datasets in their entirety. There is also a need for methods to intelligently store and model large datasets.

SUMMARY OF THE INVENTION

The present invention is a method for manipulation, storage, modeling, visualization, and quantification of datasets, which correspond to target strings. A number of target strings are provided. An iterative algorithm is used to generate comparison strings corresponding to some set of points that can serve as the domain of an iterative function. Preferably these points are located in the complex plane, such as in and/or near the Mandelbrot Set or a Julia Set. These comparison strings are also datasets or data sequences. The comparison string is scored by evaluating a function having the comparison string and one of the plurality of target strings as inputs. The evaluation may be repeated for a number of the other target strings. The score measures a relationship between a comparison string and a target string. In measuring a similarity relationship, for example, a one-to-one comparison may be performed between the numbers in the comparison string and the target string. In this example, the comparison string having the highest score is deemed most similar to the target string. The score or some other property corresponding to the comparison string is used to determine the target string's placement on a map. The target string may also be marked by a point on a visual display. The coordinates of the point corresponding to the target string or properties of the comparison string may be stored in memory, a database or a table. Mapped or marked points in a region of interest can be explored by examining a subregion with higher resolution. The points are analyzed and/or compared by examining, either visually or mathematically, their relative locations, their absolute locations within the region, and/or metrics other than location.

The method allows for many advantages over the prior art. The fingerprinting and visualization of an entire dataset, and missing values are easily accommodated. The computational requirements are lower for this method because the mapping time increases only linearly with the size of the dataset and the number of datasets. The current data does not need to be remapped when new datasets are added to the map. The number of datasets that can be mapped and compared is unlimited. The map space of a region, such as the Mandelbrot or a Julia Set, is predetermined, fixed, and highly studied. The fact that the map is fixed and predetermined, along with the fact that data can be added to the map without recalculating the points already mapped, means the present invention can store this data in memory, a database or a table. Models of the datasets, or the comparison strings, are created in the mapping process. These features allow this method to be used not only in visualization and quantification of large datasets, but also for intelligent storage and modeling of such datasets.

BRIEF DESCRIPTION OF THE DRAWINGS

The invention will be more clearly understood from the following description when read in connection with the accompanying drawings in which.

DETAILED DESCRIPTION OF THE INVENTION

Figure 1A:
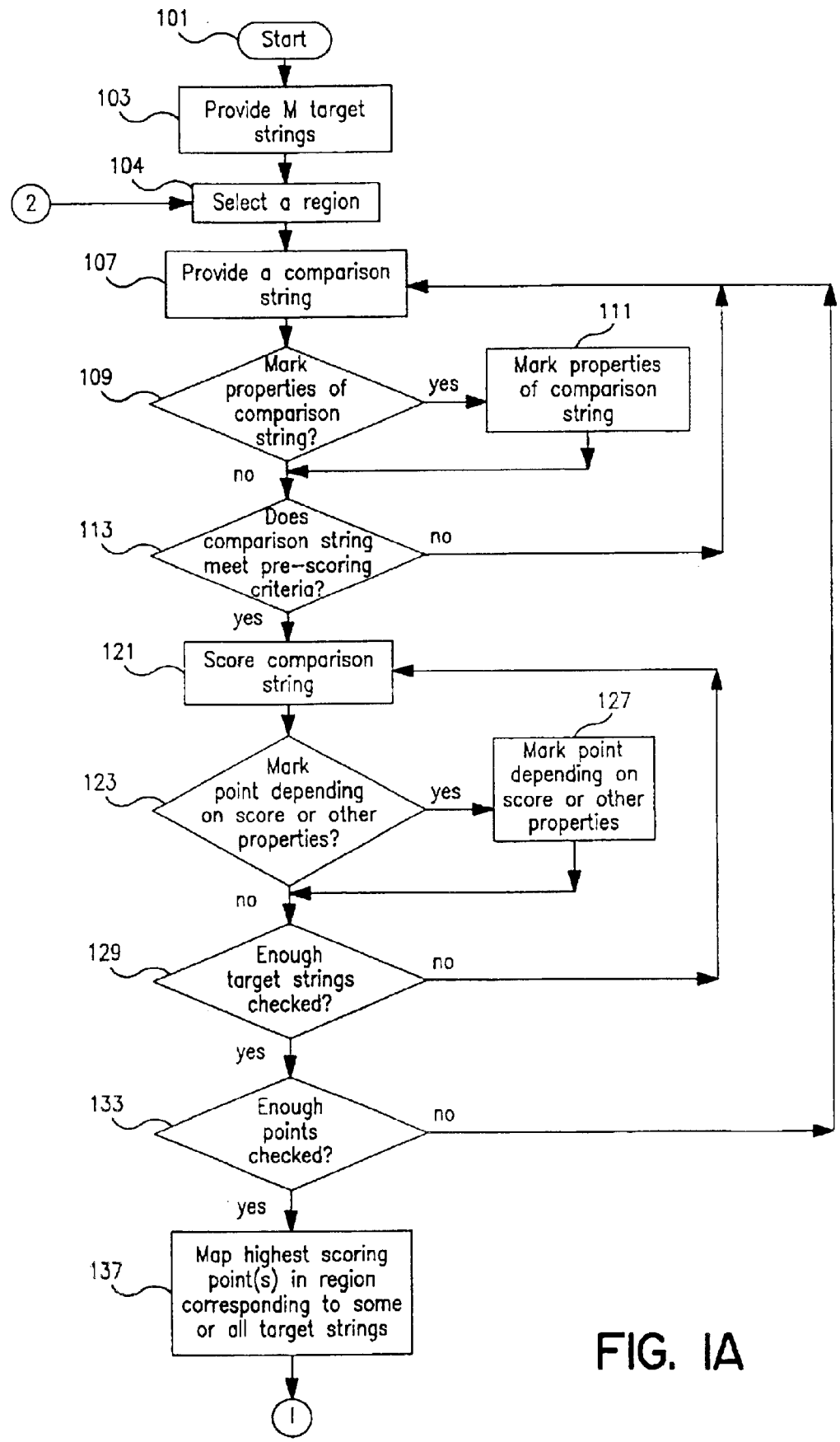
FIGS. 1A and 1B are a flow chart of the operational steps for manipulation, storage, modeling, visualization and quantification of datasets.
Figure 1B:
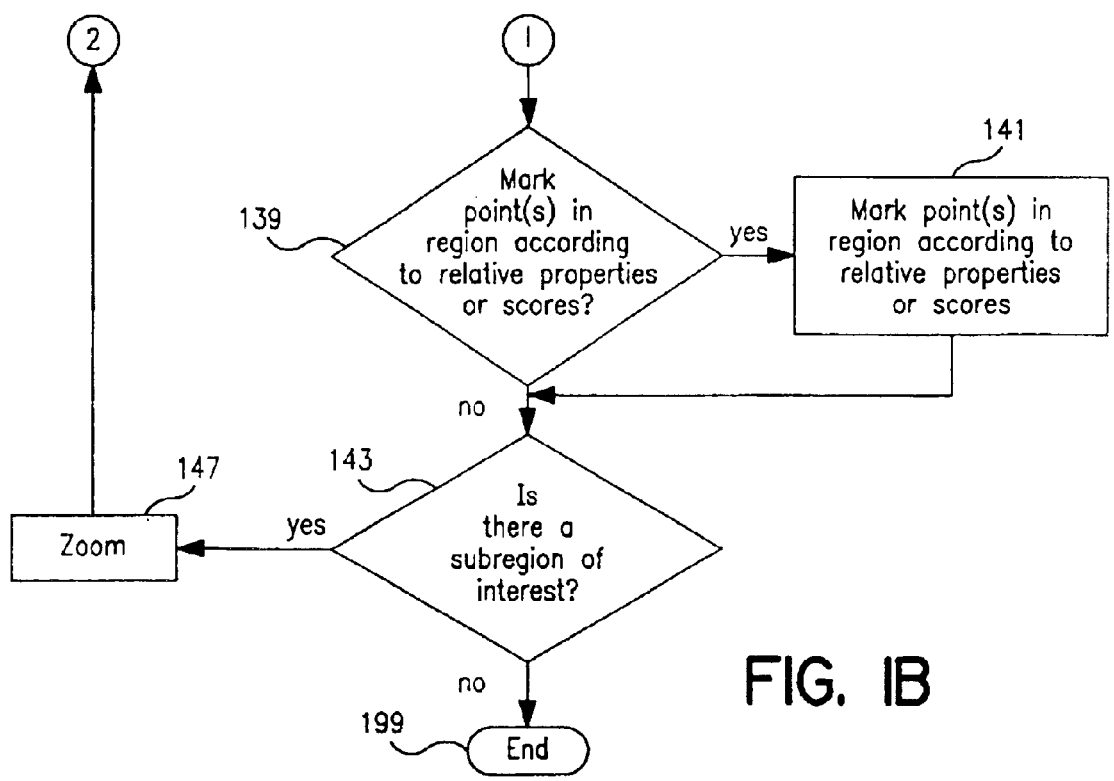

FIGS. 1A and 1B show a method for manipulation, storage, modeling, visualization and quantification of datasets. The target strings correspond to datasets to be analyzed. Each target string consists of a sequence of numbers of length $N^*$. One example of a dataset to be analyzed and its corresponding target string are the yearly income of a population, the target string being each person's income listed in a sequence. Another example is the body temperature readings of a group of patients in a hospital ward, with the target string being those readings listed in a sequence. A further example is a DNA sequence, such that each different type of base (A, C, T, G) is labeled with a number (0, 1, 2, 3), producing a target string with a corresponding numerical sequence. A further example is a protein sequence, such that each type of amino acid in the protein chain is labeled with a different number, producing a target string with a corresponding numerical sequence.

For FIGS. 1A and 1B, suppose each dataset to be analyzed is a string of measurements resulting from an experiment involving several thousand genes. Further suppose that there is a number connected with the experimental result from each gene. Such a number could be the gene expression ratio, which represents the differences in fluorescence calculated from the gene combined with some other chemical on a biochip or on a slide. This calculation is not a part of the present invention but provides the numbers in the example target strings. The number of numbers in the example target strings is $N^*$. Suppose the example target strings, or datasets, of genes are represented by strings of 7,000 real numbers, which correspond to 7,000 gene expression ratios. Thus, the value of $N^*$ is 7,000.

Starting with FIG. 1A, the method starts (step 101) by providing a set of M such target strings of length $N^*$ (step 103). A region R is selected (step 104) that can serve as the domain of an iterative function. The iterative algorithm calculates the comparison string from a point p in some region R. Preferably, the region R is in the complex plane corresponding to the area in and around the Mandelbrot Set. Although the Mandelbrot Set is used in the preferred embodiment of the present invention, other sets, such as Julia Sets, may also be used. Using this iterative method, every point within the Mandelbrot Set can be made to correspond to a data sequence of arbitrary length. Because the Mandelbrot Set is made up of an infinite number of points, the method allows any number of datasets containing any number of values to be compared by mapping the datasets to points in or near the Mandelbrot Set.

The Mandelbrot Set is an extremely complex fractal. The term "fractal" is used to describe non-regular geometric shapes that have the same degree of non-regularity on all scales. It is this property of "self-similarity" that allows pictures of artificial systems built from fractals to resemble complex natural systems.

Figure 2:
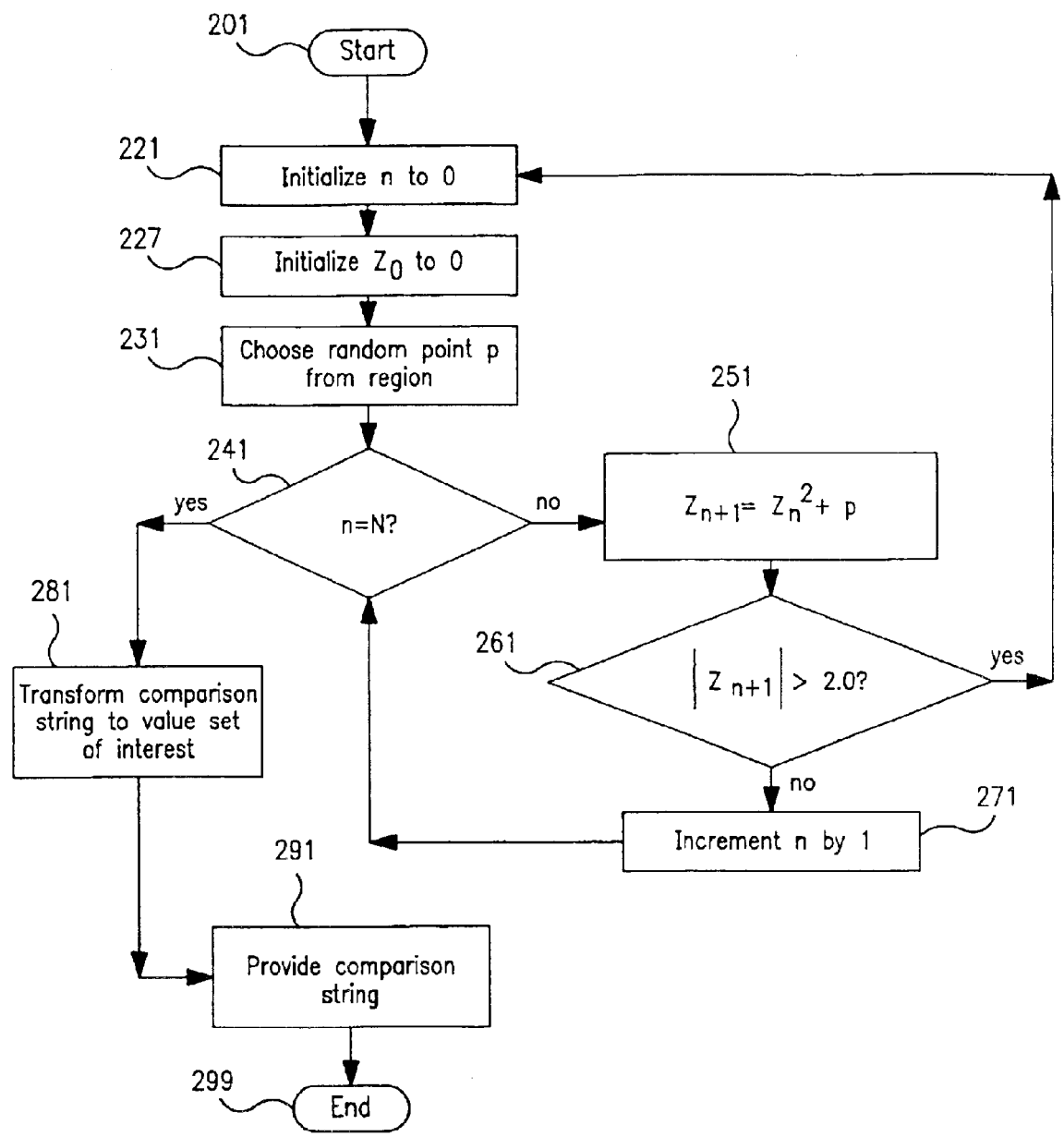
FIG. 2 is a flow chart of the operational steps for an iterative algorithm and processing which provides a comparison string.

A comparison string of length N is also provided (step 107) by using an iterative algorithm. The comparison string is also a data string and may be of any length relative to the target string. FIG. 2 shows the steps involved in the iterative algorithm to generate the comparison string of length N provided in step 107 of FIG. 1A. The algorithm of FIG. 2 is an example of an algorithm to be used for the Mandelbrot Set. If a set of points from a different iterative domain is used in this method instead of the Mandelbrot Set, a different algorithmic function would instead be used for this different set of points. The algorithm starts (201), and a counter, n, is initialized to zero (step 221). A variable to be used in the algorithm, $z_0$, is initialized to zero (step 227). A point p is chosen from region R, preferably the region corresponding to the area in and around the Mandelbrot Set (step 231). An example of choosing such a point might be to overlay a grid upon the Mandelbrot Set and then choose one of the points in the grid.

Determine if N numbers have been calculated which constitute the comparison string (step 241). In other words, check if n=N. If all the numbers of the comparison string have not yet been calculated (step 241), then the point p is used as input to the iterative algorithm $z_{n+1}=z_n^2+p$ (step 251). For example, the first iteration based on a point p is $z_1=z_0^2+p$, or $z_1=0+p$, or $z_1=p$. Since p is a complex number of the form a+bi when decomposed into its real and imaginary parts, $z_2$ takes the form $z_2=(a^2+2i*a*b-b^2)+a+bi$ or $(a^2-b^2+a)+i(b*(2a+1))$.

If the absolute value of $z_{n+1}$ is greater than 2.0, or $|z_{n+1}|>2.0$ (step 261), the iteration is stopped because it is unbounded and the $z_{n+1}$ will become infinitely large. Thus, point p is no longer under consideration. Instead, n is initialized to zero (step 221), $z_0$ is initialized to zero (step 227), and another point is instead chosen from the region R (step 231), preferably in and/or near the Mandelbrot Set.

If the absolute value of $z_{n+1}$ is equal to 2.0 or less, increment n by one (step 271) and check if N numbers have been calculated which constitute the comparison string (step 241). In other words, the algorithm iterates until n=N. If n<N, then perform the next iteration on point p (step 251). This next iteration will calculate the next number in the string of numbers comprising the comparison string. The process iterates until a string of variables, $z_1$ through $z_N$ can be produced that is of length N.

If n=N (step 241), then the comparison string has been generated. However, the numbers in the comparison string may need to be transformed to have values within a value set of interest (step 281). Suppose the numbers in the example target string representing gene expression ratios are real numbers between 0 and 10. If we wish to explore the similarities between the comparison string and the target string the value set of interest would be the real numbers between 0 and 10. The numbers of the comparison string may need to undergo some transformation to produce real numbers in this range. One way to produce such a real number is the function $r=10.0*b/|z_n|$. This will produce real numbers r falling in the range between 0 and 10 for $z_n=a+bi$. Provide the comparison string (step 291), and the algorithm ends (step 299).

Referring to FIG. 1A, determine if certain properties of the comparison string should be marked (step 109). Examples of properties that might be marked are the mean value of the comparison string or the Shannon entropy. If certain properties of the comparison string should be marked (step 109), mark the properties of the comparison string (step 111). If certain properties of the comparison string should not be marked (step 109), the comparison string is checked to determine if it meets pre-scoring criteria (step 113). This step involves preliminary testing of properties of the comparison string alone as criteria to initiate scoring. Examples of pre-scoring criteria are measuring the mean value of the comparison string to see if it higher or lower than desired and determining if the Shannon entropy of the comparison string was too low or too high. When marking prior to scoring, it may be determined that an entire subregion of the region has a large number of points that do not meet the pre-scoring criteria. For example, this subregion may be part of a grid. It may be determined that the rest of the points in that subregion will not be considered, even though the original intent was to consider all points in the region.

If the comparison string does not meet the pre-scoring criteria (step 113), then the current comparison string is no longer under consideration. Another comparison string is instead provided (step 107). The new comparison string is generated using the iterative algorithm of FIG. 2 on a new point p from region R.

If the comparison string meets the pre-scoring criteria (step 113), then scoring of the comparison string is performed (step 121). Scoring refers to some test of the comparison string using the target string. In the example of real numbers r falling in the range between 0 and 10 described above, the score could be the correlation coefficient between the comparison string consisting of numbers r and the target string. A simple example of scoring might be counting the number of one-to-one matches between the comparison string and the target string over some length L where L<=N*, where N* is the length of the target string. Alternatively, a one-to-one comparison between numbers in the comparison and target strings may be performed for a non-contiguous number L of the numbers. For example, compare the second, fourth, and sixteenth numbers for a number L=3.

Determine if the point p corresponding to the comparison string should be marked depending on the score or other properties (step 123). If it is determined that the point should be marked (step 123), mark the point (step 127). Marking can be used in an environment where a pixel or character corresponds to point p on a visual display or marking can refer to annotating the coordinates of point p in some memory, a database or a table. The point is marked by changing some graphical property of the corresponding pixel, such as color, or changing the corresponding character. The point may also be marked by annotating the coordinates of point p in some memory, a database or a table based on the score. Optionally, point p can be marked according to quantification of properties of the comparison string without regard to the score. Such properties can be pretty general, such as using some color, or annotation, to reflect the mean value of the string being in a certain range, or markings reflecting the number of 3's in the string, or the value of the Shannon entropy. Such marking can be used as an aid in searching for preliminary criteria for scoring. When marking point p, it may be determined that an entire subregion of the region has a large number of points that do not meet the relative score criteria or other properties. For example, this subregion may be part of a grid. It may be determined that the rest of the points in that subregion will not be considered, even though the original intent was to consider all points in the region, If it is determined that the point should not be marked (step 123), determine if a sufficient number of the M target strings have been checked for the point p (step 129). For instance, in our gene expression example, there may be several experiments or datasets that are being scored against each comparison string. If more of the M target strings should be checked, the comparison string is scored against another of the M target strings (step 121).

If a sufficient number of the M target strings have been checked (step 129), determine if a sufficient numbers of points corresponding to comparison strings have been checked (step 133). If more of the points corresponding to comparison strings should be checked, provide another comparison string (step 107). The new comparison string is generated using the iterative algorithm of FIG. 2 on a new point p from region R. The same M target strings will then be used to score the new comparison string.

If a sufficient number of points corresponding to comparison strings have been checked (step 133), the scoring process stops. In the case of determining the points p from a grid, this could be the number of points in the grid. The highest scoring point or points are then mapped (step 137). Mapping refers to placing the coordinates of highest scoring point or points in memory, a database or a table. The target string or strings may also be visually marked on a visual display.

Target strings may be analyzed and/or compared by examining, either visually or mathematically, their relative locations and/or absolute locations within the region R. When scoring similarity measures between the comparison strings and the target strings, target strings with greater similarity are generally mapped closer to each other based on Euclidean distance on the map. This is because comparison strings with greater similarity are generally closer to each other on the map. However, this is not always true because the metrics involved are more complicated. For example, shading of points corresponding to comparison strings with high scores for a given target string represents a metric which shows similarity between this target string and others mapped in this shaded region. The target strings in this case, however, may not appear close together on the map or display but can be identified as being similar.

Continuing to FIG. 1B, determine whether points in region R should be marked based on their relative scores or properties compared to other points in region R (step 139). If it is determined that the points should be marked (step 139), mark the points (step 141). For example, one might wish to mark all the points whose score falls within 10% of the highest score of a chosen target string, or mark points whose comparison strings have the lowest or highest Shannon entropy for the region. When marking points, it may be determined that an entire subregion of the region has a large number of points that do not meet the relative score criteria or other properties. For example, this subregion may be part of a grid. This may be used to determine whether this subregion is of interest or not.

Once the decision has been made as to whether such points should be marked (step 139), determine if a subregion of R is of interest (step 143). If a subregion of R is of interest (step 143), then this subregion is examined with higher resolution, called "zooming" (step 147). The subregion of R replaces the previous region R in selecting region R (step 104 of FIG. 1A). Comparison strings will be generated from the new subregion of R and will be scored against the same set of M target strings originally provided. Points in a subregion of interest, which were previously unchecked, will be examined because the new region R is a higher resolution version of the subregion of interest. The points in the subregion will tend to produce a greater percentage of similar comparison strings to those previously examined in region R. If the subregion of interest is a high scoring region this will, in general, produce a greater percentage of high scores and some differences will emerge to produce higher scores or properties which are closer to some desired criteria.

After zooming (step 147) and before examining the subregion, the target strings and comparison strings may optionally be transformed to attempt to improve the precision and resolution of the mapping and marking in the method. Suppose in the gene expression example, the target strings values, instead of real numbers from 0 to 10, were binned into 10 contiguous intervals, such that the first bin corresponds to real number values from 0 to 1, the second bin to real number values from 1 to 2, etc. Suppose these bins were labeled 0 to 9. The target string would then be a string of integers with values from 0 through 9. Suppose that a similar transformation was done on the transformed comparison strings. Suppose the method is performed and after zooming (step 147), the gene expression ratios and comparison strings are split into 20 such bins from 0 to 0.5, 0.5 to 1.0, etc. Thus, the target and comparison strings will be re-scaled before repeating the process in the new subregion (104 of FIG. 1A).

This re-scaling can improve the precision and accuracy of the mapping and marking in the method. There are several well studied methodologies that can be used to approach such a re-scaling to improve the precision and resolution of the mapping and marking process as zooming is performed. These include, but are not limited to, methodologies such as Simulated Annealing, Hill Climbing Algorithms, Genetic Algorithms, or Evolutionary Programming Methods.

If no other subregions of R are of interest (step 143), the method of FIGS. 1A and 1B ends (step 199). This generally results when there is no improvement in the score after some number of zooms.

It should be apparent to one skilled in the art that this technique can be used to study the behavior of any (scoring) function that uses the target strings and the comparison strings as variables. Attempting to find the highest value of the similarity measure scoring function is a particular case of this. As such, this method could be used to attempt to optimize any scoring function, using a target string or multiple target strings and comparison strings as variables, to find the function's minima and maxima. In addition, each comparison string can simply be used alone as input into the variables of a scoring function for such a purpose.

It should be apparent to one skilled in the art that this method can be used for data compression. If the model of the target string represented by a comparison string is sufficiently similar to the target string, and the coordinates of the point p corresponding to that comparison string can be represented in a more compact way then the target string, then the target string can be replaced with its more compact representation in the form of the coordinates of point p. This is because the comparison string generation algorithm can then be used to recreate a sufficiently similar representation of target string from point p.

This method has special applicability to multiple large datasets. Uses for this method include analysis of DNA sequence data, protein sequence data, and gene expression datasets. The method can also be used with demographic data, statistical data, and clinical (patient) data. The uses for this method are not limited to these datasets, however, and may be applied to any type of data or heterogeneous mixtures of different data types within datasets. Some of the steps of this method can involve determinations and interventions made by a user of the method or they can be automated.

What is claimed is:

1. A method for dataset modeling and pattern analysis for a plurality of target strings, wherein each target string is a dataset of data, the method comprising:
   (a) providing a multidimensional map comprising points which can serve as domains for an iterative algorithm to generate datasets of data, and each point in the map can be represented by coordinates of the man;
   (b) mathematically generating from a point in the multidimensional map a comparison string comprising a dataset of data, wherein the point can serve as the domain for the interative algorithm to generate a dataset of data;
   (c) scoring the comparison string to determine if the comparison string meets a pre-determined condition or property related to the target string;
   (d) marking the point in the multidimensional map if the score of the comparison string meets the pre-determined condition or property, wherein the marked point serves as a model for the target string;
   (e) repeating the steps (a)–(d) plurality of comparison strings, to generate multiple marked points on the multidimensional map; and
   (f) extracting visually or mathematically any patterns formed within each marked point or between the marked points.

2. The method of claim 1, wherein the step of mathematically generating the comparison string comprises using an iterative algorithm.

3. The method of claim 1, wherein the multidimensional map comprises a set of points in a region of a complex plane.

4. The method of claim 1, wherein the multidimensional map further comprises points in or near a Mandelbrot Set, or points both in and near a Mandelbrot Set, or a Julia Set.

5. The method of claim 1, wherein the step of mathematically generating the comparison string further comprises transforming the data in the dataset of the comparison string to have values within a set of interest.

6. The method of claim 1, wherein the step of mathematically generating the comparison string further comprises laying a grid over the points in the multidimensional map.

7. The method of claim 1, wherein the step of mathematically generating the comparison string further comprises restarting the step of mathematically generating the comparison string if the iteration is unbounded.

8. The method of claim 1, wherein the step of mathematically generating the comparison string further comprises generating a comparison string of any length.

9. The method of claim 1, wherein the step of scoring the comparison string comprises evaluating a function having the comparison string and one of the number of target strings as inputs, wherein the evaluation may be repeated for other of the number of the target strings.

10. The method of claim 9, wherein scoring of the comparison string further comprises studying the determining the function's minima and maxima.

11. The method of claim 9, wherein only the comparison string is used as relevant input to the scoring function.

12. The method of claim 1, wherein the determined condition or property comprises the comparison string having the highest score, wherein the score is based on some similarity measure to the target string.

13. The method of claim 1, wherein scoring of the comparison string further comprises preliminary testing of properties of the comparison string alone as a criterion to initiate scoring.

14. The method of claim 1, wherein scoring of the comparison string further comprises a test of the comparison string using the target string.

15. The method of claim 14, wherein not all of the data in the comparison string or the target string are used in the test.

16. The method of claim 14, wherein scoring of the comparison string further comprises a one-to-one comparison between corresponding data in the target string and the comparison string.

17. The method of claim 16, wherein the one-to-one comparison is between corresponding sequential or non-sequential data in the target string and the comparison string.

18. The method of claim 1, wherein marking the point in the multidimensional map comprises storing the coordinates of the point corresponding to the target string or properties of the comparison string in memory, a database or a table.

19. The method of claim 1, wherein marking the point in the multidimensional map comprises placing a mark on a point in a video display of the multidimensional map, the video display having pixels representing the points of the map, by changing some graphical property of the corresponding pixel of the point.

20. The method of claim 19, wherein the graphical property of the pixel is color.

21. The method of claim 1, further comprising:
   examining a plurality of subregions of the multidimensional map with higher resolution.

22. The method of claim 21, wherein the step of examining a subregion further comprises analyzing or comparing points of interest or both analyzing and comparing points of interest by examining visually or mathematically, their relative locations or absolute locations or both their relative and absolute locations within the region.

23. The method of claim 21, wherein the step of examining a subregion further comprises analyzing or comparing points of interest or both analyzing and comparing points of interest by examining, visually or mathematically, metrics other than location.

24. The method of claim 23, wherein the metrics can be represented by graphic properties.

25. The method of claim 24, wherein the graphic property is shading.

26. The method of claim 21, wherein the step of examining a subregion further comprises repeating the examining step for smaller subregions.

27. The method of claim 21, wherein the step of examining a subregion comprises reformatting of the target or comparison string, or both the target and the comparison strings to improve the precision and resolution of the method.

28. The method of claim 27, wherein the step of examining a subregion comprises a reformatting process methodology of Simulated Annealing, Hill Climbing Algorithms, Genetic Algorithms, or Evolutionary Programming Methods.

29. The method of claim 28, wherein the reformatting process is automated.

30. The method of claim 1, wherein the method is for analyzing large datasets.

31. The method of claim 30, wherein the large dataset is DNA sequence data, protein sequence data, gene expression datasets, demographic data, statistical data, or clinical data from patients.

32. The method of claim 1, wherein the method is for analyzing datasets consisting of heterogeneous data, 33. The method of claim 32, wherein the heterogeneous dataset is a combination of gene expression data and clinical data from patients.

34. The method of claim 1, wherein the method is for data compression.

35. The method of claim 1, wherein the steps are automated.

36. The method of claim 1, wherein separate processes of generating the comparison string and scoring the comparison string are processed simultaneously by a plurality of processors.

37. A method for dataset modeling and pattern analysis for a plurality of target strings, wherein each target string is a dataset of data the method comprising:
(a) providing a multidimensional map comprising points which can serve as domains for an iterative algorithm to generate datasets of data and each point can be represented by coordinates on the map;
(b) mathematically generating from a point in the multidimensional map a comparison string comprising a dataset of data, wherein the point can serve as the domain for the iterative algorithm to generate a dataset of data;
(b) scoring the comparison string by evaluating a function having the comparison string and one of the target strings as inputs, wherein the evaluation may be repeated for a number of the other target strings, to determine for each target string if a mark should be placed on the point in the multidimensional map corresponding to the comparison string;
(d) marking the point in the multidimensional map if it is determined that the point should be marked, wherein the marked point serves as a model for the target string;
(e) repeating steps (a)–(d) for a plurality of comparison strings to generate multiple marked points on the multidimensional map; and
(f) extracting visually or mathematically any patterns formed within each marked point or between the marked points.

38. A system for dataset modeling and pattern analysis for a plurality of target strings, wherein each target string is a dataset the system comprising:
(a) a multidimensional map comprising points in the map which can serve as domains for an iterative algorithm to generate datasets and each point can be represented by coordinates on the map;
(b) means for mathematically generating from the points in the multidimensional map comparison strings, each comparison string comprising a dataset and each of the points can serve as a domain for an iterative algorithm to generate a dataset;
(c) means for scoring the comparison string to determine if the comparison string meets a pre-determined condition or property related to the target string;
(d) means for marking the points in the multidimensional map if the score of the comparison string meets the pre-determined condition or property; and
(e) means for extracting visually or mathematically any patterns formed within each marked point or between the marked points.

39. The system of claim 38, wherein the means for mathematically generating the comparison string comprises means for using an iterative algorithm, wherein the comparison string is calculated from a point in any set of points that can serve as the domain of the iterative algorithm.

40. The system of claim 38, wherein the multidimensional map comprises a region of a complex plane.

41. The system of claim 38, wherein the multidimensional map comprises points in or near a Mandelbrot Set, or points both in and near a Mandelbrot Set, or a Julia Set.

42. The system of claim 38, wherein the means for mathematically generating the comparison string further comprises means for transforming the data in the dataset of the comparison string to have values within a set of interest.

43. The system of claim 38 further comprises means for laying a grid over the points in the multidimensional map.

44. The system of claim 38, wherein the means for mathematically generating the comparison string further comprises means for restarting mathematically generating the comparison string if the iteration is unbounded.

45. The system of claim 38, wherein the means for mathematically generating the comparison string further comprises means for generating a comparison string of any length.

46. The system of claim 38, wherein the means for scoring of the comparison string is a means for evaluating a function having the comparison string and one of the number of target strings as inputs, wherein the evaluation may be repeated for other of the number of the target strings.

47. The system of claim 46, wherein the means for scoring the comparison string further comprises means for determining the function's minima and maxima.

48. The system of claim 46, wherein only the comparison string is used as relevant input to the scoring function.

49. The system of claim 38, wherein the pre-determined condition or property comprises the comparison string having the highest score, wherein the score is based on some similarity measure to the target string.

50. The system of claim 38, wherein means for scoring of the comparison string further comprises means for preliminary testing of properties of the comparison string alone as a criterion to initiate scoring.

51. The system of claim 38, wherein the means for scoring of the comparison string further comprises a test of the comparison string using the target string.

52. The system of claim 51, wherein not all of the data in the comparison string or the target string are used in the test.

53. The system of claim 51, wherein the means for scoring the comparison string further comprises a one-to-one comparison between the corresponding data in the target string and in the comparison string.

54. The system of claim 53, wherein the one-to-one comparison is between corresponding sequential or non-sequential data in the target string and in the comparison string.

55. The system of claim 38, wherein the means for marking the point in the multidimensional map comprises means for storing the coordinates of the point corresponding to the target string or storing the properties of the comparison string in memory, a database or a table.

56. The system of claim 38, wherein the means for marking the point in the multidimensional map comprises means for placing a mark on a point in a video display of the multidimensional man, the video display having pixels representing the points of the map, by changing some graphical property of the corresponding pixel.

57. The method of claim 56, wherein the graphical property of the pixel is color.

58. The system of claim 38, further comprising:
means for examining a plurality of subregions of the multidimensional map with higher resolution.

59. The system of claim 58, wherein the means for examining a subregion comprises means for reformatting the target or comparison string, or both the target and the comparison strings to improve the precision and resolution of the system.

60. The system of claim 59, wherein the means for examining the subregion comprises a reformatting process methodology of Simulated Annealing, Hill Climbing Algorithms, Genetic Algorithms, or Evolutionary Programming Methods.

61. The system of claim 58, wherein the means for examining a subregion further comprises means for analyzing or comparing points of interest or both analyzing and comparing points of interest by examining visually or mathematically their relative locations or absolute locations or both their relative and absolute locations within the region.

62. The system of claim 58, wherein the means for examining a subregion further comprises means for analyzing or comparing points of interest or both analyzing and comparing points of interest by examining visually or mathematically metrics other than location.

63. The system of claim 62, wherein the metrics can be represented by graphical properties.

64. The method of claim 63, wherein the graphic property is shading.

65. The system of claim 58, wherein the means for examining a subregion further comprises means for repeating the means for examining for smaller subregions.

66. The system of claim 38, wherein the system is used for analyzing large datasets.

67. The method of claim 66, wherein the large dataset is DNA sequence data, protein sequence data, gene expression datasets, demographic data, statistical data, or clinical data from patients.

68. The system of claim 38, wherein the system is used for analyzing datasets consisting of heterogeneous data.

69. The method of claim 68, wherein the heterogeneous dataset is a combination of gene expression data and clinical data from patients.

70. The system of claim 38, wherein the system is used for data compression.

71. The system of claim 38, further comprising a plurality of processors for simultaneously providing the means for generating and for providing the means for scoring the comparison string.

* * * * *